July 3, 1934.    C. O. J. MONTELIUS    1,965,557
PUMP OR MOTOR
Filed March 1, 1929

C. O. J. Montelius
INVENTOR

By: Marks & Clerk
Attys.

Patented July 3, 1934

1,965,557

UNITED STATES PATENT OFFICE 1,965,557

PUMP OR MOTOR

Carl Oscar Josef Montelius, Stockholm, Sweden, assignor to Aktiebolaget Imoindustri, Stockholm, Sweden, a corporation of Sweden Application March 1, 1929, Serial No. 343,676
In Sweden March 9, 1928

7 Claims. (Cl. 103—128)

United States Patent No. 1,698,802 describes an arrangement intended to be used as a pump or motor and consisting of two cooperating screws of certain shapes, said screws being of opposite pitch and rotating in opposite directions, and being tightly surrounded by a casing. These two screws act together as a piston which on the rotation of the screws advances the fluid, liquid or gas present within the casing, in the direction along the axis of the screws. Both screws thus cooperate, and both of them perform a certain amount of work. It is preferable to drive only one of the screw shafts and a certain amount of the power must therefore be transferred by means of a gear from the shaft of the one screw to that of the other. If a greater amount of power is to be transmitted, this gear assumes very large dimensions, however, and in a small apparatus it also involves a tedious complication which it is important to avoid.

The present invention relates to an arrangement of said screws where one screw is entirely or in part relieved from the work which will thus be performed, either wholly or in part, by the other screw.

The principal feature of the invention consists in an arrangement such that mechanical work is transferred to or delivered by only one of the shafts of the cooperating screws, the cross-sectional areas of the screws being so selected in relation to each other that the screw or screws placed on the said shaft perform or receive the major portion of the pumping work. The said cross-sectional areas may be so selected in relation to each other that the screw or screws placed on the said shaft perform the whole or substantially the whole work, so that the power that must be supplied for the rotation of the cooperating screws is reduced to a minimum. The screws may be made with so great a pitch that one screw drives the other without the agency of gear or other mechanical power transmission means.

Figure 1:
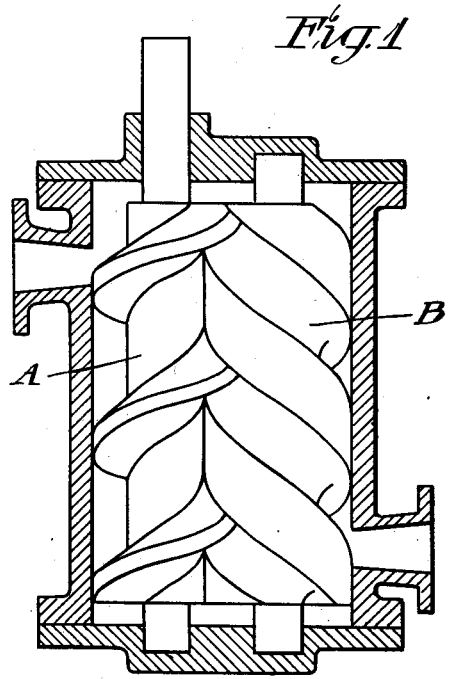
Figure 2:
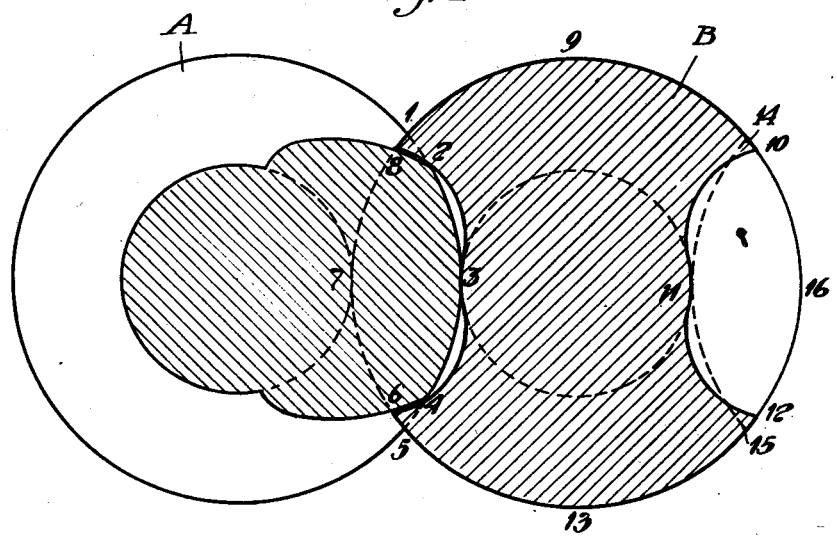

The accompanying drawing illustrates an embodiment of an arrangement according to this invention, Fig. 1 showing a longitudinal view of two cooperating screws with a casing in sectional view and Fig. 2 a cross-section on a larger scale of the two screws, without the casing. The casing has an 8-shaped section and fits to the outside of the pair of screws.

In order to make the invention clearly understood, it is necessary first to elucidate the circumstances having any influence on the working capacity and the dimensioning of the screws.

It is obvious that when the screws A and B are in any given position their threads form a closure shutting off the 8-shaped bore of the casing like a piston. When the screws are rotated the closure is axially displaced a distance corresponding to the thread pitch of screw B for each revolution of screw B. The volume then displaced corresponds to a cylinder having a bottom surface equal to the cross-sectional area of the 8-shaped bore, the height equalling the pitch of B, which however is to be reduced by the volume of the same length of the screws. On the other hand, the screw volume in a pitch length is equal to the volume of a cylinder having a base area equal to the total cross-sectional area of the screw, and having a height equal to the thread pitch.

Mathematically expressed, the volumetric displacement, i. e., the volume delivered, by a single revolution of screw B is, $$V = S(A_s - G_1 - G_2), \text{ where}$$

$A_s$ designates the cross-sectional area of the 8-shaped bore of the screw casing, $G_1$ the cross-sectional shaded area of the single-thread screw A, $G_2$ the cross-sectional shaded area of the double-thread screw B, all of these cross-sections being taken at right angles to the axis, and S designates the pitch of screw B.

If the difference of the liquid pressure per unit of surface between the pressure and the suction sides is $p$, the work done by the pump is, $$E = pV = pS(A_s - G_1 - G_2)$$

Considering screw B, there can be readily calculated the work $E_2$ which it may be considered as contributing to the total work E in one revolution. $E_2$ may be written in the form $E_2 = pSK_2$ where $K_2$ will be a constant calculated from the dimensions of screw B and having the dimensions of an area. Likewise the work $E_1$ contributed by screw A in two of its revolutions, (corresponding to one revolution of screw B), may be written $E_1 = pSK_1$.

Since $E_1 + E_2 = E$, $$K_1 + K_2 = A_s - G_1 - G_2.$$

For convenience of expression, we can define quantities $A_1 = K_1 + G_1$ and $A_2 = K_2 + G_2$ so that $A_s = A_1 + A_2$ and $E_1 = pS(A_1 - G_1)$, and $E_2 = pS(A_2 - G_2)$.

If the screw sections $G_1$ and $G_2$ were proportioned so that either $A_1 = G_1$ or $A_2 = G_2$, then $E_1$ and $E_2$ respectively would be zero. The design of the screws for proper coaction with each other precludes $A_1=G_1$ so that, for satisfactory design, it is not feasible to make $E_1=O$. But $A_2$ may be made equal to $G_2$ so that $E_2=O$, under which condition the whole of the work is done by the single-thread screw A, the double-thread screw B serving only as a rotating tightening means.

To determine the design which will give $E_2=O$, it is necessary to determine $A_2$ in terms of the screw dimensions, or, preliminarily, $K_2$. Since work is done only by those portions of the surface of a body which move in a direction having a component in the direction of the pressure thereon, it is seen that, neglecting fluid friction, the total work done by screw B must be done by the helicoidal surfaces of its grooves. By the integration over such surfaces of the contributions to the work by various elements thereof, it is found that the work done in one revolution is equal to $pS$ multiplied by twice the difference of the cross-sectional area of a groove of screw B, taken at right angles to the axis of rotation, and the axial projection of the overlap of the two screws. That is, if M is the area given by 2—3—4—6—7—8—2 or 10—11—12—16—10, i. e., the cross-sectional area of the screw groove, and N is the axial projection of the overlap of the two screws, namely, the area 1—2—3—4—5—6—7—8—1, $$E_2 = 2pS(M-N)$$

so that:

$$K_2 = 2(M-N).$$

or:

$$A_2 = K_2 + G_2 = 2M - 2N + G_2$$

Now, $G_2 = \pi r^2 - 2M$, so that:

$$A_2 = \pi r^2 - 2N$$

where $r$ is the radius of screw B. $A_2$ is accordingly the cross-sectional area of the cylindrical envelope of screw B less twice the axial projection of the overlap of the two screws, or the area 1—9—14—11—15—13—5—4—3—2—1. For the condition of no work by the screw B, $A_2$ must equal $G_2$ so that the area 8—1—9—10—11—12—13—5—6—4—3—2—8 must be equal to 1—9—14—11—15—13—5—4—3—2—1.

Similar considerations apply to other pairs of screws of the type referred to in my Patent No. 1,698,802.

The object of the invention being that the minimum possible mechanical power shall have to be supplied to the cooperating tightening screw B, it is preferable to proportion the screws so that the liquid pressure exerts a small moment just sufficient to overcome the friction in rotating the screw. If the device is used as a pump, the double-thread screw B should therefore be made somewhat "over-compensated", that is to say the screw grooves 8—2—3—4—6 and 10—11—12 respectively should be given a somewhat smaller area than the covering surface 1—3—5—7 and the corresponding surface 14—11—15—16 respectively. On the other hand, if the device is driven by the pressure of the liquid, the same screw is made somewhat undercompensated, that is to say the same thread grooves are given a somewhat larger area than the covering surface.

By the fact that the mechanical power between the screws may be reduced to a minimum, the very simple arrangement shown in Figs. 1 and 2 is rendered possible, this arrangement involving the combination of a driving screw and a cooperating screw, with so great a pitch in the screws that the one screw A will drive the other screw B without the agency of a gear or other power transmission means.

It will be noted that the design is such that there is no mechanical interchange of any substantial amount of power between the two screws. By "substantial" amount of power is meant, for example, power considerably in excess of that merely required to overcome friction. In general, the power required to overcome friction of the idler screw is much less than the useful power handled by the pump or motor.

What I claim is:—

1. A rotary pump or motor comprising a plurality of meshing rotary screws and a housing fitting tightly the circumference of said screws and provided free entrance and exit for fluid at the ends of the screws, said screws including a power screw, and at least one other screw meshing with said power screw, the screws being constructed and related so that their rotation is unaccompanied by a mechanical interchange between them of any substantial amount of power.

2. A rotary pump or motor comprising a plurality of meshing rotary screws and a housing fitting tightly the circumference of said screws and providing free entrance and exit for fluid at the ends of the screws, said screws being constructed and related to form a positive displacement device and including a power screw, and at least one other screw meshing with said power screw, the screws being constructed and related so that their rotation is unaccompanied by a mechanical interchange between them of any substantial amount of power.

3. A rotary pump or motor comprising a plurality of meshing rotary screws and a housing fitting tightly the circumference of said screws and providing free entrance and exit for fluid at the ends of the screws, said screws including a power screw, and at least one other screw meshing with said power screw, the threads of said two screws having, respectively, convex and concave helicoidal side surfaces, and the screws being constructed and related so that their rotation is unaccompanied by a mechanical interchange between them of any substantial amount of power.

4. A rotary pump or motor comprising a plurality of meshing rotary screws and a housing fitting tightly the circumference of said screws and providing free entrance and exit for fluid at the ends of the screws, said screws being constructed and related to form a positive displacement device and including a power screw, and at least one other screw meshing with said power screw, the threads of said two screws having, respectively convex and concave helicoidal side surfaces, and the screws being constructed and related so that their rotation is unaccompanied by a mechanical interchange between them of any substantial amount of power.

5. A rotary pump or motor comprising a plurality of meshing rotary screws and a housing fitting tightly the circumference of said screws and providing free entrance and exit for fluid at the ends of the screws, said screws including a power screw, and at least one other screw meshing with said power screw, the threads of said two screws having, respectively, convex and concave helicoidal side surfaces, the edges of the threads of each screw having substantially fluid-tight relationship with the helicoidal surfaces of the threads of the other screw, and the cross-sectional area of the second screw being substantially equal to the cross-sectional area of its cylindrical envelope less the product of the axial projection of the overlap of said two screws by the number of threads on the second screw.

6. A rotary pump or motor comprising a plurality of meshing rotary screws and a housing fitting tightly the circumference of said screws and providing free entrance and exit for fluid at the ends of the screws, said screws being constructed and related to form a positive displacement device and including a power screw, and at least one other screw meshing with said power screw, the threads of said two screws having, respectively, convex and concave helicoidal side surfaces, and the cross-sectional area of the second screw being substantially equal to the cross-sectional area of its cylindrical envelope less the product of the axial projection of the overlap of said two screws by the number of threads on the second screw.

7. A rotary pump or motor comprising a plurality of meshing rotary screws and a housing fitting tightly the circumference of said scews and providing free entrance and exit for fluid at the ends of the screw, said screws being constructed and related to form a positive displacement device and including a power screw, and at least one other screw meshing with said power screw, the threads of said two screws having, respectively, convex and concave helicoidal side surfaces, the edges of the threads of each screw having substantially fluid-tight relationship with the helicoidal surfaces of the threads of the other screw, and the cross-sectional area of the second screw being substantialy equal to the cross-sectional area of its cylindrical envelope less the product of the axial projection of the overlap of said two screws by the number of threads on the second screw.

CARL OSCAR JOSEF MONTELIUS.